Figures 1, 2:
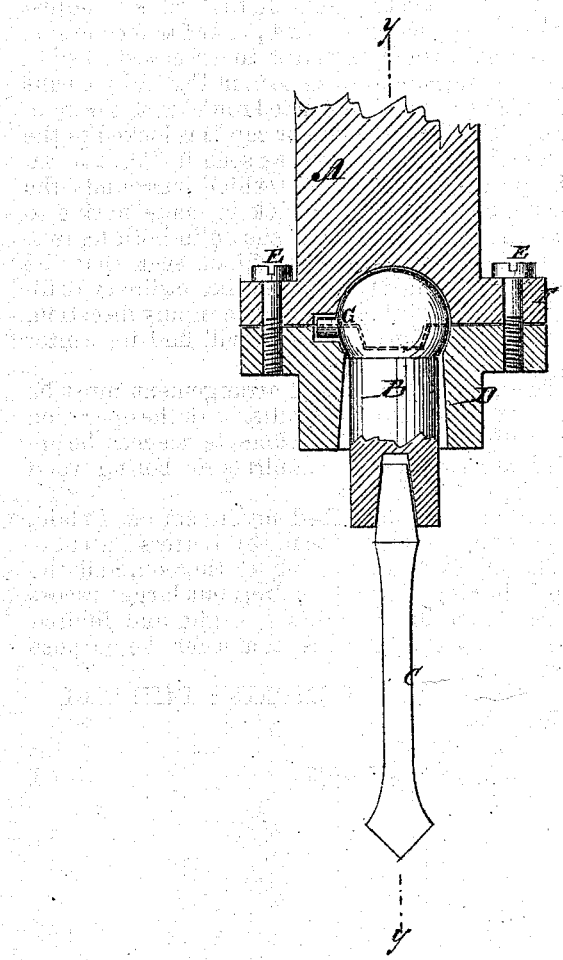

No. 119,173.  Patented Sep. 19, 1871.

P. Philippi, Drill Chuck.

Witnesses:
C. Raettig
L. S. Mabee

Inventor:
P. Philippi
per Munn & Co.
Attorneys.

UNITED STATES PATENT OFFICE.

POMPEIUS PHILIPPI, OF BEARDSTOWN, ILLINOIS.

IMPROVEMENT IN DRILL-CHUCKS.

Specification forming part of Letters Patent No. 119,173, dated September 19, 1871.

*To all whom it may concern:*

Be it known that I, POMPEIUS PHILIPPI, of Beardstown, in the county of Case and State of Illinois, have invented a new and useful Improvement in Drill-Chucks; and I do hereby declare that the following is a full, clear, and exact description thereof, which will enable others skilled in the art to make and use the same, reference being had to the accompanying drawing forming part of this specification.

My invention relates to a new way of giving end play to drill-bits while in the act of being centered and continually thereafter; and consists in allowing a slight but constant lateral play to the chuck, within which the shank of the bit is made fast, as hereinafter fully described and subsequently pointed out in the claim.

In the accompanying drawing, Figure 1 represents a longitudinal sectional view of the arrangement taken on the line $x\,x$ of Fig. 2. Fig. 2 is a longitudinal section on the line $y\,y$ of Fig. 1.

Similar letters of reference indicate corresponding parts.

A is the mandrel or shaft. B is the drill-chuck. C is the drill. D is a flanged plate or cap, by means of which the chuck is secured to the end of the mandrel by the screws E E. The end of the mandrel is provided with a hemispherical cavity, which the end of the chuck is made to fit. The globular end of the chuck not only fills the cavity in the end of the mandrel but extends out from it, and is of greater diameter than the socket portion of the chuck. The cap D is made to slip over the socket portion of the chuck and to fit a portion of the ball, as seen in the drawing, so that, when it is screwed up to the flange F on the end of the mandrel or secured in its proper position, the chuck will be held to the mandrel, but not tightly, the globe or ball being allowed to turn, so that the point of the drill will adjust itself to the center. G is a pin or lug on one side of the ball, which is placed in a recess formed in the cap and mandrel, as seen in Fig. 1, by means of which the chuck is carried round with the mandrel. The flanged plate or cap D is locked to the flange F of the mandrel, as seen in Fig. 2 at H. The portion of the cap D which surrounds the socket portion of the chuck is made flaring to give the chuck play, as is shown in both figures.

By this arrangement it will be seen that the chuck is not rigidly confined like ordinary drill-chucks, but is allowed to move in any direction, so that the point of the drill will find its center and run true.

The advantages of this arrangement must be obvious to all who are familiar with the operation of drilling metals. The same device may be applied to auger or bit-mandrels for boring wood with equal advantage.

Having thus described my invention, I claim as new and desire to secure by Letters Patent—

The chuck B having lug G thereon, and the cap D having a corresponding but larger recess therein, adapted to allow a slight and limited lateral play to said chuck, as and for the purpose described.

POMPEIUS PHILIPPI.

Witnesses:
S. EMMONS,
N. M. PURVIANCE.

(22.)